United States Patent [19]

Narita

[11] 4,095,152
[45] June 13, 1978

[54] REGENERATIVE BRAKE CONTROL SYSTEM FOR DC MOTOR

[75] Inventor: Hiroshi Narita, Katsuta, Japan

[73] Assignee: Hitachi, Ltd., Japan

[21] Appl. No.: 694,726

[22] Filed: Jun. 10, 1976

[30] Foreign Application Priority Data

Jun. 16, 1975 Japan .................................. 50-71883

[51] Int. Cl.² ............................................ H02P 3/14
[52] U.S. Cl. .................................................. 318/376
[58] Field of Search ........................ 318/376, 379, 380

[56] References Cited

U.S. PATENT DOCUMENTS

| | | | |
|---|---|---|---|
| 3,930,191 | 12/1975 | Loderer | 318/376 |
| 3,947,740 | 3/1976 | Tsuboi | 318/376 |
| 3,983,465 | 9/1976 | Tsuboi et al. | 318/376 |
| 3,984,743 | 10/1976 | Horie | 318/379 X |

Primary Examiner—Robert K. Schaefer
Assistant Examiner—W. E. Duncanson, Jr.
Attorney, Agent, or Firm—Craig & Antonelli

[57] ABSTRACT

In order to effect regenerative brake control from a high speed with a chopper, a resistor is inserted in a motor circuit. The duty cycle of the chopper is reduced before the resistor being shorted, thereby dampening the increase of the voltage across a filtering capacitor which otherwise might occur at the time of the resistor being shorted.

6 Claims, 7 Drawing Figures

REGENERATIVE BRAKE CONTROL SYSTEM FOR DC MOTOR

BACKGROUND OF THE INVENTION

1. Field of the Invention

This invention relates to a control system for effective stable regenerative braking from high speed by means of a chopper with a resistor inserted in the DC motor circuit.

2. Description of the Prior Art

In the regenerative brake control of a DC series motor with a chopper device, for example, the motor operates as a DC series generator and therefore the motor voltage fails to exceed a source voltage. This raises a problem of a shortage of braking force at high speeds. In order to solve this problem, the well-known regenerative brake control consists in connecting a resistor in series with the DC motor to provide an aid in the form of dynamic breaking. This resistor is operatively inserted at a high speed where the source voltage is exceeded by the motor voltage, so that the motor voltage less the voltage drop across the resistor is prevented from exceeding the source voltage.

By setting the resistance value of the resistor at an appropriate value, it is thus possible to obtain a required braking force at high speeds. The resistor is shorted when, as a result of deceleration of the motor, the motor voltage is reduced below the source voltage.

However, another problem is that, at the time of the resistor shorting, the source voltage (i.e. voltage across the filtering capacitor) increases by a value equivalent to about the voltage drop across the resistor. In other words, when the resistor is shorted, the motor current tends to increase but is discouraged as the current control system reduces a duty cycle of the chopper device. The reduction in the chopper duty cycle causes an increased current component flowing into the power supply side, thereby increasing the source voltage.

To overcome this problem, the breakdown voltage of the devices actually used must be sufficiently high as compared with the above-mentioned increase in the source voltage, resulting in the disadvantage of high cost of the device. This is especially the case with the thyristor, diode or other semiconductor device used for a chopper whose breakdown voltage must be high enough.

SUMMARY OF THE INVENTION

An object of the present invention is to provide a regenerative brake control system for DC motors in which the increase in a source voltage which otherwise would occur at the time of shorting of a resistor in a motor circuit of the DC motors is dampened.

The features of the present invention is that a resistor is inserted in the motor circuit to effect a regenerative brake control from high speeds with a chopper and that a duty cycle of the chopper is decreased before the shorting of the resistor.

DESCRIPTION OF THE PREFERRED EMBODIMENTS

The present invention will be explained below with reference to an electric car.

Figure 1:
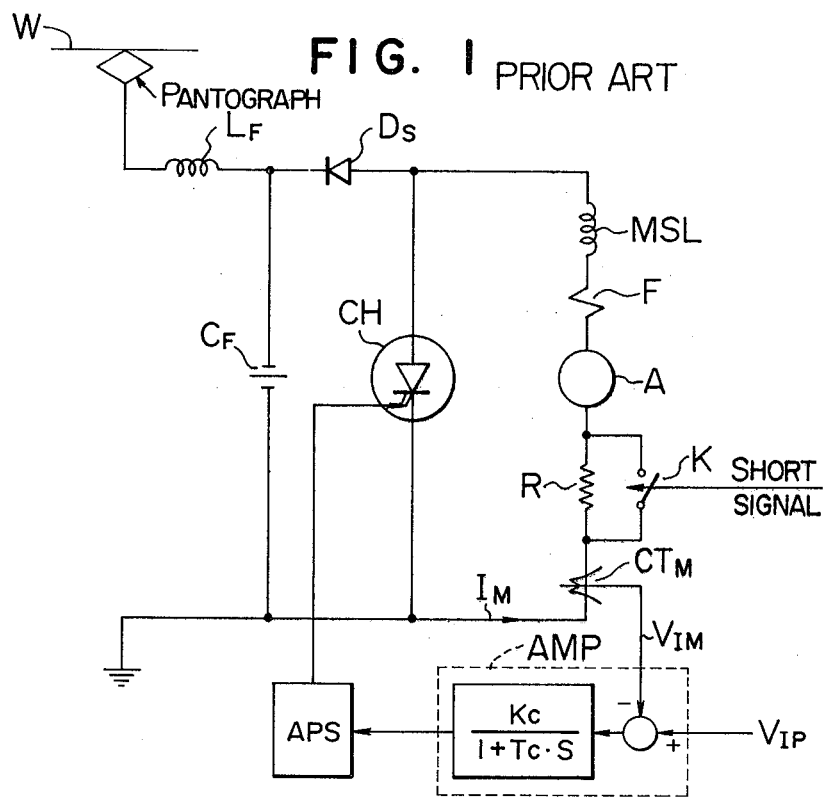
FIG. 1 is a diagram showing an example of a conventional regenerative brake control system for DC motors.

In FIG. 1 showing a conventional circuit, reference characters $L_F$ and $C_F$ show a filtering reactor and a filtering capacitor respectively for filtering the source voltage, character symbol MSL a smoothing reactor for removing the pulsation of the motor current $I_M$, character F a field winding of the DC motor, character A an armature of the DC motor, character R a resistor, character K a contactor for shorting the resistor R, character CH a chopper device, and character Ds a diode for preventing the shorting of the power supply when the chopper CH is on and for returning the motor current $I_M$ to the power supply when it is off. All of these component parts make up a main circuit.

In this main circuit, the resistor R is inserted in series in the motor circuit for the DC motor comprising the armature M and the field winding F including the smoothing reactor MSL. The chopper CH is connected in parallel with the series circuit including the motor circuit and the resistor R. One of the terminals of the parallel circuit is connected to the anode of the diode Ds, and the other terminal thereof to ground. The cathode of the diode Ds is connected to a terminal of the filter capacitor $C_F$ and the filtering reactor $L_F$. The other terminal of the filtering reactor $L_F$ is connected through a pantograph P to a trolly wire W. The other terminal of the filtering capacitor $C_F$ is connected to ground.

The motor current $I_M$ is detected by the current detector $CT_M$, so that a voltage $V_{IM}$ proportional to the motor current $I_M$ is produced from the current detector $CT_M$. The voltage $V_{IM}$ is compared with a current command $V_{IP}$ (given as a voltage value) in the comparative amplifier AMP of the current control system, and a deviation therebetween is applied to a phase shifter APS through a 1st order lag factor ($K_c/[1 + T_c \cdot S]$), where S is Laplace Operator, $K_c$ a gain and $T_c$ a time constant. The output of an automatic phase shifter APS is applied to the chopper CH, so that the output width of the phase shifter, namely, the duty cycle $\gamma$ of the chopper CH is controlled in accordance with the deviation. As a result, the motor current $I_M$ is controlled in compliance with the current demand value $V_{IP}$.

The duty cycle $\gamma$ of the chopper CH is expressed as $$\gamma = T_{on}/(T_{on} + T_{off}) = T_{on}/T \tag{1}$$

where $T_{on}$ is the "on" period of the chopper, $T_{off}$ is the "off" period thereof and T is the total cycle of the chopper operation.

Now, when the chopper CH is turned on, the motor current IM flows in a closed loop including the chopper CH, the resistor R, the armature A, the field winding F, the smoothing reactor MSL and again the chopper CH in that order. When the chopper CH is turned off, on the other hand, regenerative current flows from ground to the power supply through the resistor R, the armature M, the field winding F, the smoothing reactor MSL and the diode $D_S$.

It is already explained that the resistor R is operatively inserted in the circuit only at high speeds, and it is shorted by the contactor K when the motor voltage is reduced below about the source voltage as a result of car deceleration.

Figure 2:
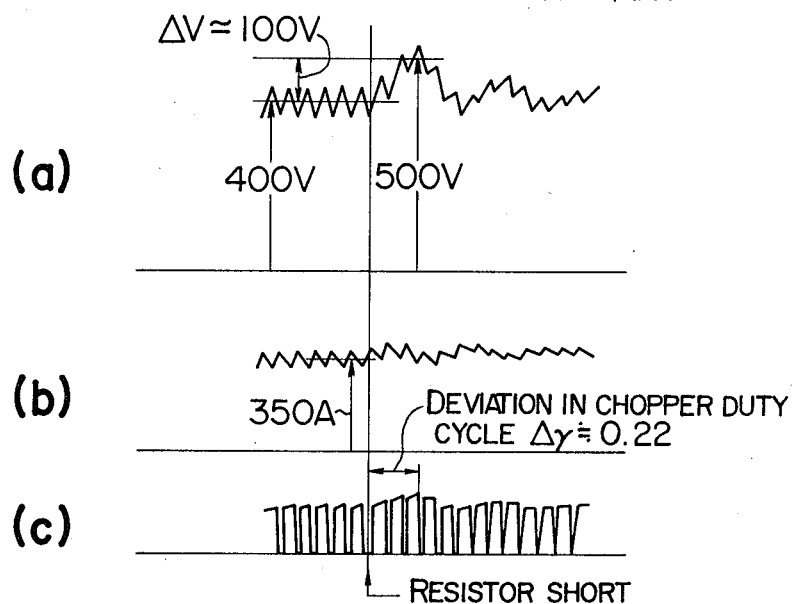
FIG. 2 shows waveforms for explaining the operation of the circuit of FIG. 1.

The waveforms of signals produced from the operation of the devices at the time of the shorting of the resistor R are shown in FIG. 2. Waveform (a) shows the source voltage, namely, a voltage across the filtering capacitor $C_F$, waveform (b) the motor current $I_M$ and (c) the terminal voltage of the chopper CH.

Referring to FIG. 2, when the resistor R is shorted, the motor current $I_M$ tends to increase. Nonetheless, the operation of the current control system causes the duty cycle $\gamma$ of the chopper CH to be reduced as shown in (c) thereby to dampen the increase in the motor current $I_M$ as shown in (b). The motor current $I_M$ therefore undergoes little change. Due to the reduction in the duty cycle $\gamma$ of the chopper CH, however, the current component $I_M \Delta \gamma$ flowing into the filtering capacitor $C_F$ increases, with the result that the voltage across the filtering capacitor $C_F$ sharply increases as shown in (a).

In this case, let the variation of the duty cycle $\gamma$ of the chopper be $\Delta \gamma$, and the increment $\Delta V$ of the voltage across the filter capacitor $C_F$ may be expressed as $$\Delta V \cong I_M \Delta \gamma \cdot \sqrt{L_F/C_F} \qquad (2)$$

Further, assuming that the terminal voltage of the filtering capacitor $C_F$ under normal conditions is $V_{CF}$, the variation in the terminal voltage of the chopper CH is $V_{CF} \Delta \gamma$. Since the value $V_{CF} \Delta \gamma$ is equal to the voltage variation $I_M R$ across the resistor R, the voltage increment $\Delta V$ across the filtering capacitor $C_F$ is given alternatively as $$\Delta V \cong (I_M^2 \cdot R/V_{CF}) \sqrt{L_F/C_F} \qquad (3)$$

FIG. 2 shows an example of oscillograms measured actually on the device tested by the inventors. The experiment was conducted with the source voltage of 400 V (the terminal voltage of the filtering capacitor $C_F$), the motor current $I_M$ of 350 A, the operating frequency of 300 Hz of chopper CH, and the gain $K_c$ and the time constant $T_c$ of 5 and 4.5 ms respectively of the 1st order lag factor ($K_c/[1 + T_c \cdot S]$) for regulating the stability of the current control system, within such a range as to attain stable current control.

In the oscillogram of FIG. 2, $C_F$ = 3,200 $\mu F$, $L_F$ = 5.6 mH and $\Delta \gamma$ = 0.22. Therefore, the increase $\Delta V$ in the terminal voltage of the filter capacitor $C_F$ shown in equation (2) is $$\Delta V \cong 350 \times 0.22 \times \sqrt{5.6/3.2} \cong 100 \; V \qquad (3)$$

This voltage increase, as converted to that for the circuit involving the source voltage of 1500 V actually used on an electric car, reaches as high as approximately 400 V. Also, the increment $\Delta V$, as will be seen from equation (2), is greater, the larger the motor current $I_M$ and the greater the variation in the duty cycle $\gamma$ of the chopper CH.

The greater increment $\Delta V$ makes it necessary to select component elements of the main circuit, especially, the thyristor or other semiconductor element used in the chopper and the diode with a high breakdown voltage. This results in a high cost of the device and is uneconomical.

Figure 3:
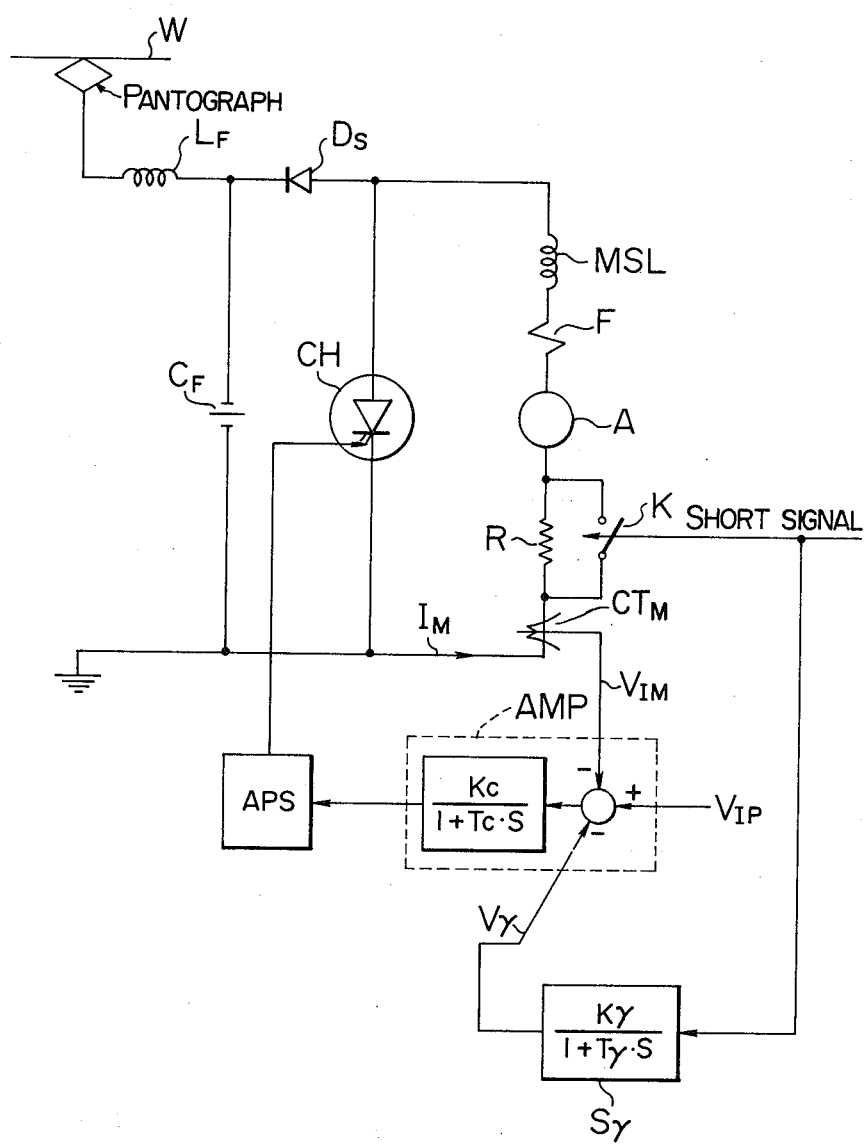
FIG. 3 is a diagram showing an embodiment of the regenerative brake control system for DC motors according to the present invention.

The present invention is intended to dampen the increase in the source voltage or the terminal voltage of the filtering capacitor which otherwise might occur at the time of the resistor R shorting. The circuit of FIG. 3 shows an embodiment of the invention which is different from the circuit configuration of FIG. 1 in that a duty cycle-changing circuit $S\gamma$ is inserted for reducing the duty cycle $\gamma$ of the chopper CH before the shorting of the resistor R. The output $V\gamma$ of the duty cycle changing circuit $S\gamma$ is applied to the comparative amplifier station AMP. The duty cycle $\gamma$ of the chopper CH is reduced to a predetermined level thereby to dampen the increase in the terminal voltage of the filtering capacitor $C_F$.

In other words, no voltage increase occurs if the variation $V_{CF} \Delta \gamma$ of the terminal voltage of the chopper CH equivalent to the voltage drop $I_M R$ across the shorted resistor R is reduced to such a degree that the duty cycle of the chopper CH decreases by $\Delta \gamma = I_M \cdot R/V_{CF}$. This may be considered due to the fact that, by reducing the duty cycle $\gamma$ of the chopper CH by $\Delta \gamma$, the motor current $I_M$ is also reduced with the result that the voltage increase is dampened in proportion to the square of the motor current $I_M$ according to the relation of the equation (3).

In FIG. 3, a duty cycle-changing circuit $S\gamma$ is energized in response to a short signal for the resistor R. At the same time, the short signal is applied to the contact K as an operating signal. Since the contact K has a delay time (100 ms to 180 ms for the contact usually used with an electric car), the duty cycle $\gamma$ of the chopper CH may conveniently be reduced by the duty cycle-changing circuit $S\gamma$ before the contact K is closed. The duty cycle-changing circuit $S\gamma$ is comprised of a primary delay element $K\gamma/1 + T\gamma \cdot S$, where S is Laplace Operator, $K\gamma$ a gain and $T\gamma$ a time constant, and it produces a voltage signal $V\gamma$ for reducing the duty cycle $\gamma$ of the chopper CH. This voltage signal $V\gamma$ is applied to the comparative amplifier station AMP of the current control system in such a manner as to reduce the current command $V_{IP}$, hence, the duty cycle $\gamma$.

Let the reduction in the chopper duty cycle $\gamma$ during the first chopper control cycle be $\Delta \gamma_1$. The increment in the current flowing into the filtering capacitor $C_F$ is $I_M \Delta \gamma_1$. The increment $\Delta V_1$ of the voltage across the filtering capacitor $C_F$ is therefore given as $$\Delta V_1 = I_M \Delta \gamma_1 / C_F f_{CH} \qquad (4)$$

where $f_{CH}$ is the operating frequency of the chopper CH. This voltage $\Delta V_1$ is required to be reduced below the increment $(\Delta V)_{max}$ allowable for the filtering capacitor $C_F$.

$$\Delta V_1 \leq (\Delta V)_{max} \qquad (5)$$

Thus the first reduction $\Delta \gamma_1$ of the chopper duty cycle $\gamma$ must be $$\Delta \gamma_1 \leq (\Delta V)_{max} \cdot C_F f_{CH}/I_M \qquad (6)$$

It is also necessary that the amount of reduction $\Delta\gamma_n$ of the chopper duty cycle $\gamma$ in the second and subsequent cycles of chopper control be $$\Delta\gamma_n \leqq \Delta\gamma_1 \qquad (7)$$

In this way, the duty cycle $\gamma$ is controlled until it takes the minimum value $\gamma_{min}$.

The chopper duty cycle $\gamma$ is reduced as mentioned above, and when the resistor R is shorted by the contact K, the increase in the voltage across the filtering capacitor $C_F$ is discouraged.

Figure 4:
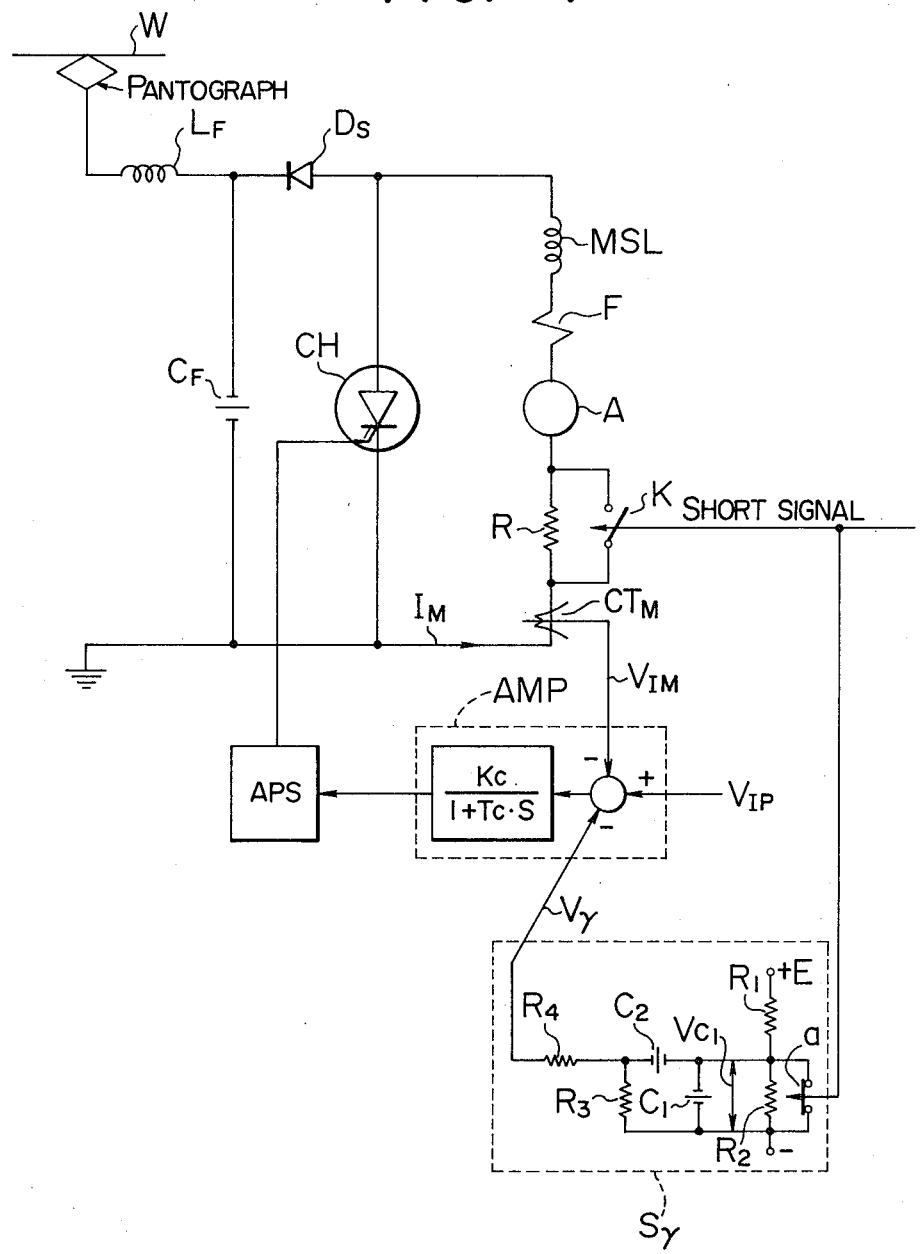
FIG. 4 is a diagram showing circuit of FIG. 3 more in detail.

A detailed example of the duty cycle-changing circuit $S\gamma$ of FIG. 3 in shown in FIG. 4.

In the duty cycle-changing circuit FIG. 4, reference character E shows a control power supply, which, like that for the phase shifter APS or the comparative amplifier station AMP (not shown), is introduced from a separate system. Characters $R_1$ to $R_4$ show resistors having the correlation $R_1 \simeq R_2 < R_3 < R_4$. Characters $C_1$ and $C_2$ show capacitors having the relation $C_1 < C_2$. Character $a$ shows a contact of a relay opened for operating the duty cycle-changing circuit $S\gamma$ in response to a short signal for the resistor R. As compared with the contact K for shorting the resistor R, the contact $a$ is very short in delay time.

As described above, the duty cycle-changing circuit $S\gamma$ is comprised of the 1st order lag factor ($K\gamma/[1 + T\gamma \cdot S]$) involving the following relations:

$$V_{cl} = [R_2/(R_1 + R_2)] \cdot E \qquad (8)$$

$$T\gamma = [(R_1 \cdot R_2)/(R_1 + R_2)] \cdot C_1 \qquad (9)$$

$$K\gamma = R_4/(R_3 + R_4) \qquad (10)$$

Figure 5:
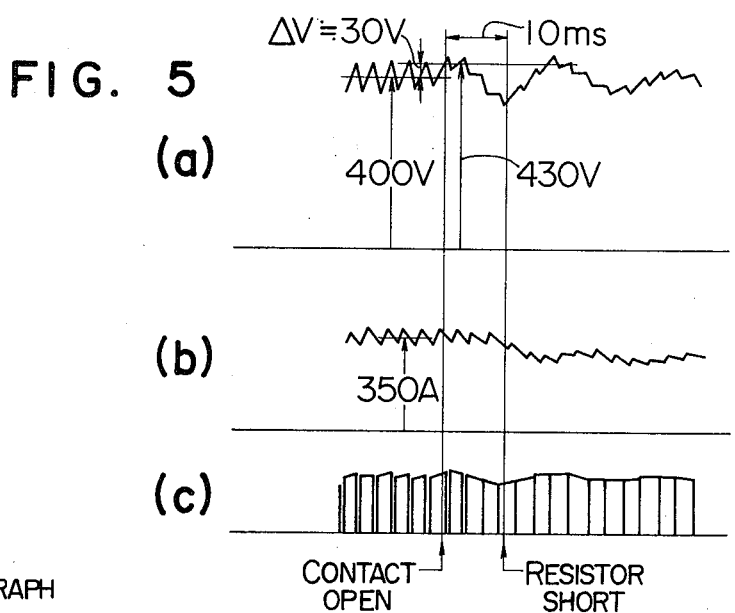
FIG. 5 shows waveforms for explaining the operation of the circuit of FIG. 4.

An oscillogram of the operation as tested by the inventors on the circuit of FIG. 4 is shown in FIG. 5. The circuit constants of FIG. 4 include E = 3V, $R_1 = R_2 =$ 50 k$\Omega$, $R_3 =$ 100 K$\Omega$, $R_4 =$ 500 K$\Omega$, $C_1 =$ 0.4 $\mu$F, and $C_2 =$ 1.5 $\mu$F while the time constant $T\gamma$ is 10 ms, the gain $K\gamma$ 0.8 and the maximum of voltage $V_{cl}$, 1.5 V. The other constants are identical with those for FIG. 1.

In FIG. 4, character (a) shows a waveform of the terminal voltage of the filtering capacitor $C_F$, character (b) a waveform of the motor current $I_M$ and character (c) a waveform of the terminal voltage of the chopper CH.

It is seen that the contact $a$ opens about 10 ms before the shorting of the resistor R and that the increase in the voltage across the filtering capacitor $C_F$ at the time of reduction in the chopper duty cycle and the shorting of the resistor R is held at approximately 30 V. This means that in the circuit of an electric car involving a source voltage of 1500 V, the voltage increase is controlled at about 120 V. The voltage increase may be held at a smaller amount, for example, by increasing the time constant $T\gamma$ to more than 10 ms while at the same time increasing the time from the opening of the contact $a$ to the shorting of the resistor R to the voltage $V_{cl}$ at the time constant due to the capacitor $C_2$ and the resistor $R_3$, the voltage $V\gamma$ is reduced from the voltage $V_{cl}$ at the time constant due to capacitor $C_2$ and resistor $R_3$, so that the motor current $I_M$ is restored to its value before the shorting of the resistor R. In the embodiment of FIG. 5, the motor current $I_M$ is restored to its original value at the time constant of 150 ms due to the capacitor $C_2$ and resistor $R_3$.

With reference to the equations (6) and (7), the reduction $\Delta\gamma$ in the chopper duty cycle $\gamma$ will be explained more in detail.

As shown in FIG. 5, if the controlled voltage increase in $(\Delta V)_{max} =$ 30 V, the reduction $\gamma_1$ of the chopper duty cycle during the first cycle is expressed, from the equation (6), as $$\Delta\gamma_1 = (\Delta V)_{max} \cdot (C_F \cdot f_{CH}/I_M) = 30\ V \times (3000\ \mu F \times 300\ Hz\ /360\ A) = 0.075$$

Therefore, from equation (7), the reduction $\Delta\gamma_n$ for the second and subsequent cycles of chopper control is $$\Delta\gamma_n \leqq \Delta\gamma_1 = 0.075$$

It will be understood from the foregoing description that, according to the embodiment under consideration, the increase in the voltage across the filtering capacitor $C_F$ occurring at the time of shorting of the resistor R may be controlled at a desired value.

Figure 6:
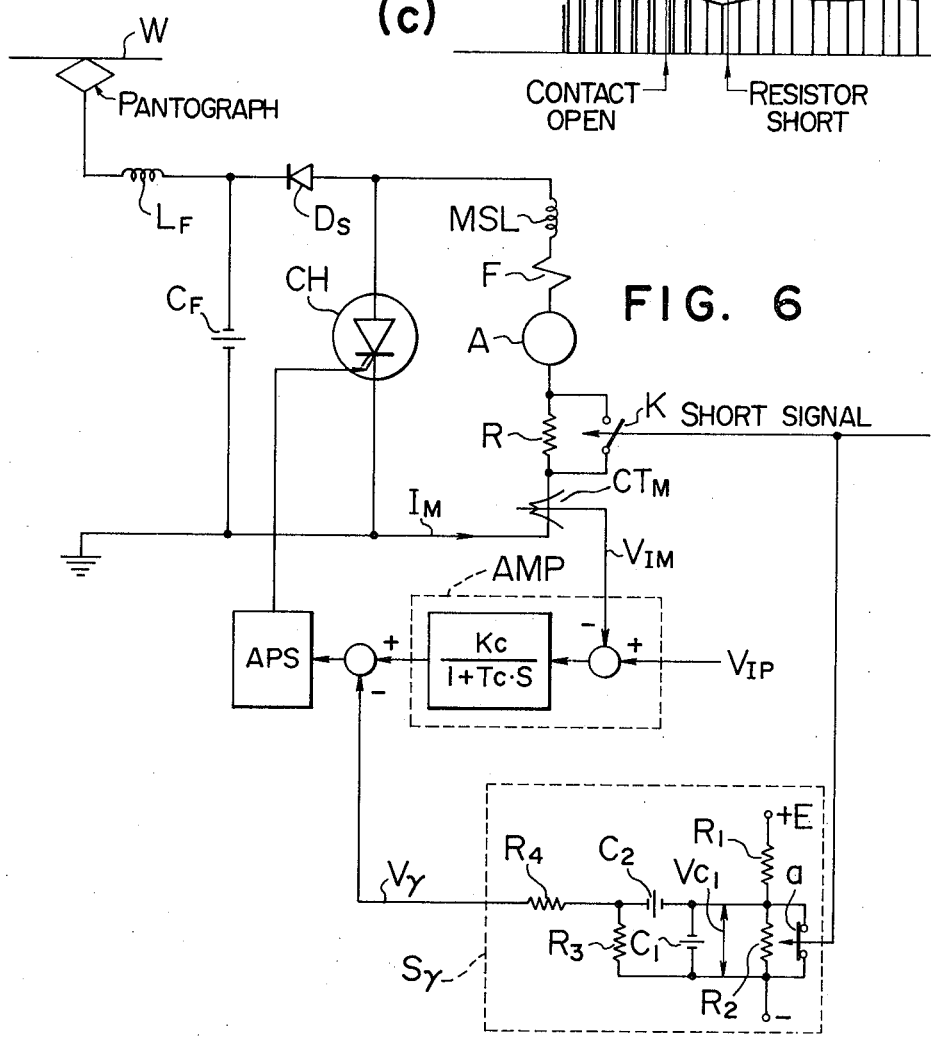
FIG. 6 is a diagram showing another embodiment of the present invention.

Another embodiment of the present invention is illustrated in FIG. 6. This embodiment is such that the chopper duty cycle is reduced to a desired level by reducing the input to the phase shifter APS of the current control system before the shorting of the resistor R. The signal circuit included in the embodiment of FIG. 5 with its circuit constants somewhat varied may be used as a corresponding circuit to be connected to the input of the phase shifter APS in FIG. 6.

Figure 7:
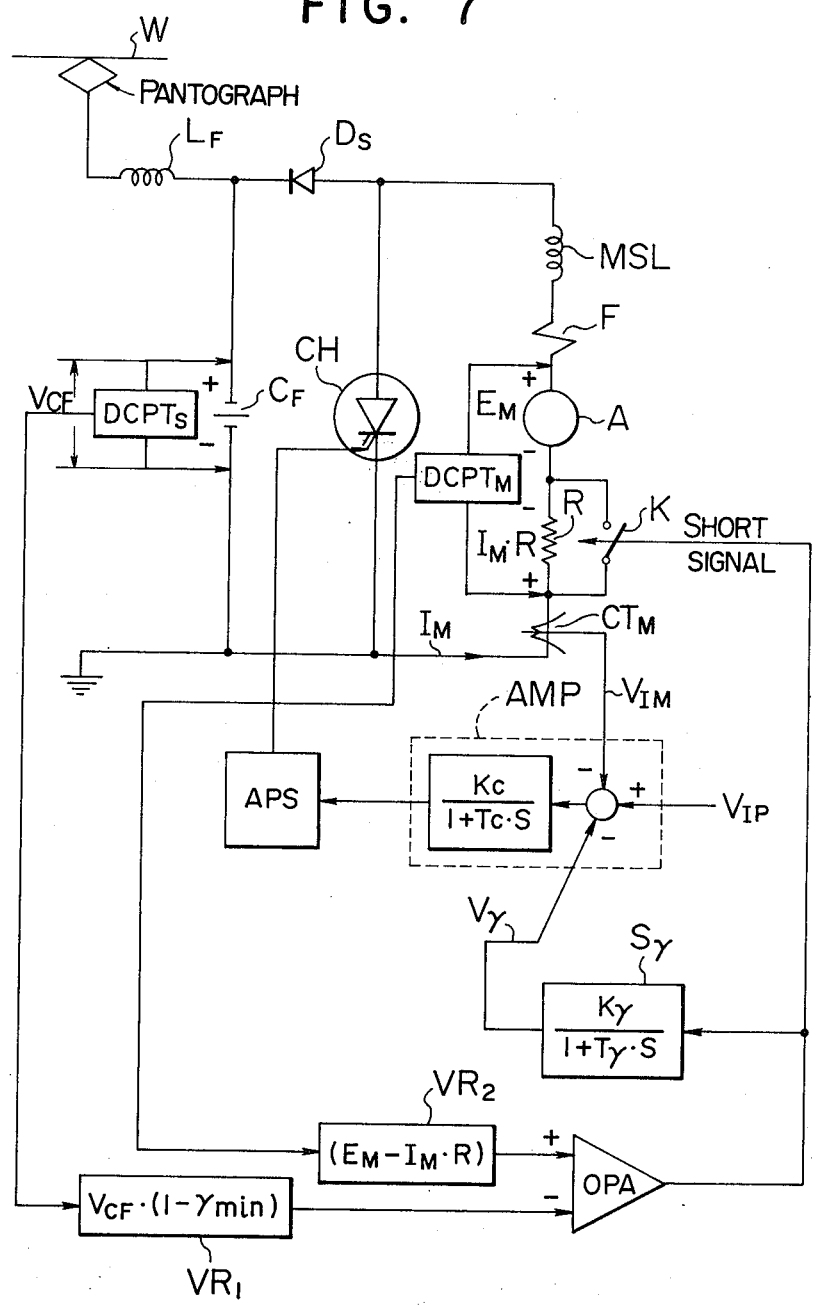
FIG. 7 shows still another embodiment of the invention.

Still another embodiment of the invention is shown in FIG. 7. As will be apparent from the embodiments shown in FIGS. 4, 5 and 6, the operating signal is applied to the duty cycle-changing circuit $S\gamma$ at the same time that the short signal is applied to the contact K. An example of the manner in which the short signal is generated is shown in FIG. 7. The terminal voltage $V_{CF}$ of the filtering capacitor $C_F$ is detected by the voltage detector $DCPT_S$, so that an equivalent source voltage $V_{CF}(1 - \gamma_{min})$ taking into consideration the minimum duty cycle $\gamma_{min}$ of the chopper CH is produced at the circuit $VR_1$. The output voltage $V_{CH}$ of the chopper CH (namely, the deviation between motor terminal voltage $E_M$ the voltage drop $I_M \cdot R$ across the resistor R) is detected by the voltage detector $DCPT_M$, so that a signal voltage equivalent to the voltage deviation $(E_M - I_M R)$ is produced at the circuit $VR_2$. The deviation between the signals from the circuits $VR_1$ and $VR_2$ is produced from the operational amplifier OPA. A short signal is generated at the time point when the relation below is satisfied.

$$V_{CF}(1 - \gamma_{min}) - (E_M - I_M R) > I_M R \qquad (11)$$

In this way, the increase in the voltage across the filtering capacitor $C_F$ is dampened at the time of the resistor R being shorted on one hand while the chopper duty cycle $\gamma$ after the shorting of the resistor R is always maintained at minimum level of $\gamma_{min}$, thus making it possible to increase the amount of the regenerative power.

In the above-described embodiments, the contact K is used as a means for shorting the resistor R. The contact K may of course be replaced by a semiconductor switch such as a thyristor. In this case, however, the short signal is required to be applied to the shorting means of a semiconductor switch after the reduction of the chopper duty cycle $\gamma$ by making use of a well-known delay circuit.

Also, instead of a stage of resistor R, a plurality of stages thereof may of course be used and successively shorted.

As seen from the foregoing description, according to the invention, the duty cycle of the chopper CH is reduced before shorting the resistor R inserted in the motor circuit. This makes it possible not only to control the increase in the source voltage, namely, the voltage across the filtering capacitor $C_F$ but to select a lower breakdown voltage of the devices than the conventional system, thus leading to the advantage of low cost.

I claim:

1. A regenerative brake control system for DC motors comprising
   a series circuit including a DC motor circuit and a resistor, means responsive to a shorting signal for shorting said resistor, a chopper connected in parallel with said series circuit, a filtering circuit including a filtering capacitor connected through a diode to said parallel circuit of said chopper and said series circuit, and a power supply connected to said filtering circuit, current control means for controlling the duty cycle of said chopper in accordance with the deviation between a current command and the value of current flowing in said motor circuit, and a phase shifter for controlling the on-off operation of said chopper in accordance with the output of said current control means, and duty cycle control means responsive to said shorting signal for reducing the duty cycle of said chopper before said resistor is shorted.

2. A regenerative brake control system according to claim 1, in which said means for shorting said resistor is a contactor and said duty cycle control means for reducing the duty cycle of said chopper provides a 1st order lag factor.

3. A regenerative brake control system according to claim 2, in which said current control means includes means responsive to the output of said duty cycle control means for reducing the value of said current command of said current control means.

4. A regenerative brake control system according to claim 2, in which means responsive to the output of said duty cycle control means is connected to the output of said current control means for reducing the input to said phase shifter.

5. A regenerative brake control system according to claim 2, in which the reduction $\Delta\gamma_1$ in the duty cycle $\gamma$ of said chopper produced by said duty cycle control means during the first cycle of chopper control is $$\Delta\gamma_1 \leq (\Delta V)_{max} \cdot (C_F f_{CH}/I_M)$$

where $(\Delta V)_{max}$ is the voltage increase allowed across said filtering capacitor, $C_F$ the capacitance of said filtering capacitor, $f_{CH}$ the operating frequence of said chopper, and $I_M$ the motor current in said motor circuit, and the reduction $\Delta\gamma_n$ in said duty cycle $\gamma$ of said chopper produced by said duty cycle control means for the second and subsequent cycles of said chopper control is $$\Delta\gamma_n \leq \Delta\gamma_1$$

6. A regenerative brake control system according to claim 2, further including means for generating said shorting signal such that the relation between the equivalent source voltage $V_{CF} \cdot (1 - \gamma_{min})$ corresponding to the terminal voltage $V_{CF}$ of said filtering capacitor with the minimum duty cycle $\gamma_{min}$ taken into consideration and the deviation between the terminal voltage $E_M$ of said motor and the voltage drop $I_M \cdot R$ across said resistor, satisties the following relation $$V_{CF} \cdot (1 - \gamma_{min}) - (E_M - I_M \cdot R) \geq I_M \cdot R$$

* * * * *